(12) United States Patent
Payne et al.

(10) Patent No.: US 8,267,187 B2
(45) Date of Patent: Sep. 18, 2012

(54) HARROW TINE ANGLE ADJUSTMENT

(75) Inventors: David Alan Payne, Urbandale, IA (US); Richard Joseph Connell, Slater, IA (US); Shawn Becker, Ankeny, IA (US); Garrett Lee Goins, Ankeny, IA (US)

(73) Assignee: Deere & Company, Moline, IL (US)

( * ) Notice: Subject to any disclaimer, the term of this patent is extended or adjusted under 35 U.S.C. 154(b) by 1502 days.

(21) Appl. No.: 11/365,194

(22) Filed: Mar. 1, 2006

(65) Prior Publication Data

US 2007/0284125 A1 Dec. 13, 2007

(51) Int. Cl.
*A01B 19/00* (2006.01)
(52) U.S. Cl. .......... 172/613; 172/639; 172/657
(58) Field of Classification Search ......... 172/63, 172/622, 615, 624.5, 614, 618, 620, 640, 172/799.5, 142, 311, 639, 173, 195, 196, 172/197, 198, 662, 657, 621, 705; 37/449, 37/454, 456, 303, 342; 111/145, 52, 62; 171/DIG. 2, 5, 443, 111, 63
See application file for complete search history.

(56) References Cited

U.S. PATENT DOCUMENTS

| | | | | |
|---|---|---|---|---|
| 536,231 A * | 3/1895 | Pickett | | 172/500 |
| 1,462,120 A * | 7/1923 | Monroe | | 172/197 |
| 2,960,169 A * | 11/1960 | Collins | | 172/198 |
| 3,016,958 A * | 1/1962 | Knapp et al. | | 172/639 |
| 3,043,377 A * | 7/1962 | Urben | | 172/611 |
| 3,128,834 A * | 4/1964 | Birkenbach et al. | | 172/635 |
| 3,255,831 A * | 6/1966 | Kirkpatrick, Jr. | | 172/611 |
| 4,624,322 A * | 11/1986 | Lowe et al. | | 172/620 |
| 4,813,489 A * | 3/1989 | Just et al. | | 172/175 |
| 5,044,449 A * | 9/1991 | Stirek et al. | | 172/634 |
| 6,164,386 A * | 12/2000 | Delaurier | | 172/622 |
| 6,626,246 B2 * | 9/2003 | Gerber et al. | | 172/142 |
| 6,688,405 B2 * | 2/2004 | Steinlage | | 172/705 |
| 2002/0144826 A1 * | 10/2002 | Gerber et al. | | 172/142 |
| 2003/0085044 A1 * | 5/2003 | McFarlane | | 172/146 |

\* cited by examiner

*Primary Examiner* — Thomas B Will
*Assistant Examiner* — Matthew D Troutman

(57) ABSTRACT

A simplified spike tooth harrow includes an apertured bracket pivotally connected to the fore-and-aft connecting strap extending between the tine bars. The bracket adjustably supports a tine bar from the strap. A pin selectively secured in one of the apertures contacts the strap to set the working angle of the tines on the bar when the harrow is operated in the field. A chain or link connected to the bracket at a location offset from the bracket pivot suspends the harrow from an upper drawbar assembly which is movable vertically between field-working and transport positions. When the drawbar assembly is raised to the transport position so the harrow is out of ground contact, the bracket pivots so the pin is offset from the strap and can be easily and quickly removed from the aperture and reinserted in a different aperture to change the tine angle.

9 Claims, 2 Drawing Sheets

HARROW TINE ANGLE ADJUSTMENT

FIELD OF THE INVENTION

The present invention relates generally to agricultural tillage equipment and, more specifically, to structure for adjusting the tooth working angle on a tine harrow.

BACKGROUND OF THE INVENTION

Toothed harrow attachments are commonly mounted behind tillage implements such as field cultivators to level soil and help break up large clods. Several ranks of teeth are supported from a drawbar arrangement, and for accommodating tooth adjustments of the aggressiveness of the harrow, the ranks often are pivotally connected to bracket members attached to drawbars. Such attachments often include a relatively large number of components for mounting the ranks. Some harrows require dismantling of components and hardware removal to reposition individual components to change the pitch angle of the teeth. Adjustments can be very time-consuming because of the number of components in each joint and the need to handle individual heavy spike tooth bar sections.

Commonly assigned U.S. Pat. No. 6,688,405 shows a simplified harrow assembly. Although alleviating some of the problems, such assemblies are relatively expensive and complicated.

SUMMARY OF THE INVENTION

It is therefore an object of the present invention to provide an improved spike tooth harrow assembly that overcomes most or all of the aforementioned problems. It is a further object to provide such a harrow which is easy to adjust and simple and inexpensive in construction.

A simplified spike tooth harrow includes an apertured bracket pivotally connected to the fore-and-aft connecting strap extending between the tine bars. The bracket adjustably supports a tine bar from the strap. A pin selectively secured in one of the apertures contacts the strap to set the working angle of the tines on the bar when the harrow is operated in the field. A chain or link connected to the bracket at a location offset from the bracket pivot suspends the harrow from an upper drawbar assembly which is movable vertically between field-working and transport positions. When the drawbar assembly is raised to the transport position so the harrow is out of ground contact, the bracket pivots so the pin is offset from the strap and can be easily and quickly removed from the aperture and reinserted in a different aperture to change the tine angle. Disassembly of pivoting joints and connectors and need for expensive and complicated linkages are eliminated.

These and other objects, features and advantages of the present invention will become apparent upon reading the following detailed description in view of the drawings.

DESCRIPTION OF THE PREFERRED EMBODIMENT

Figure 1:
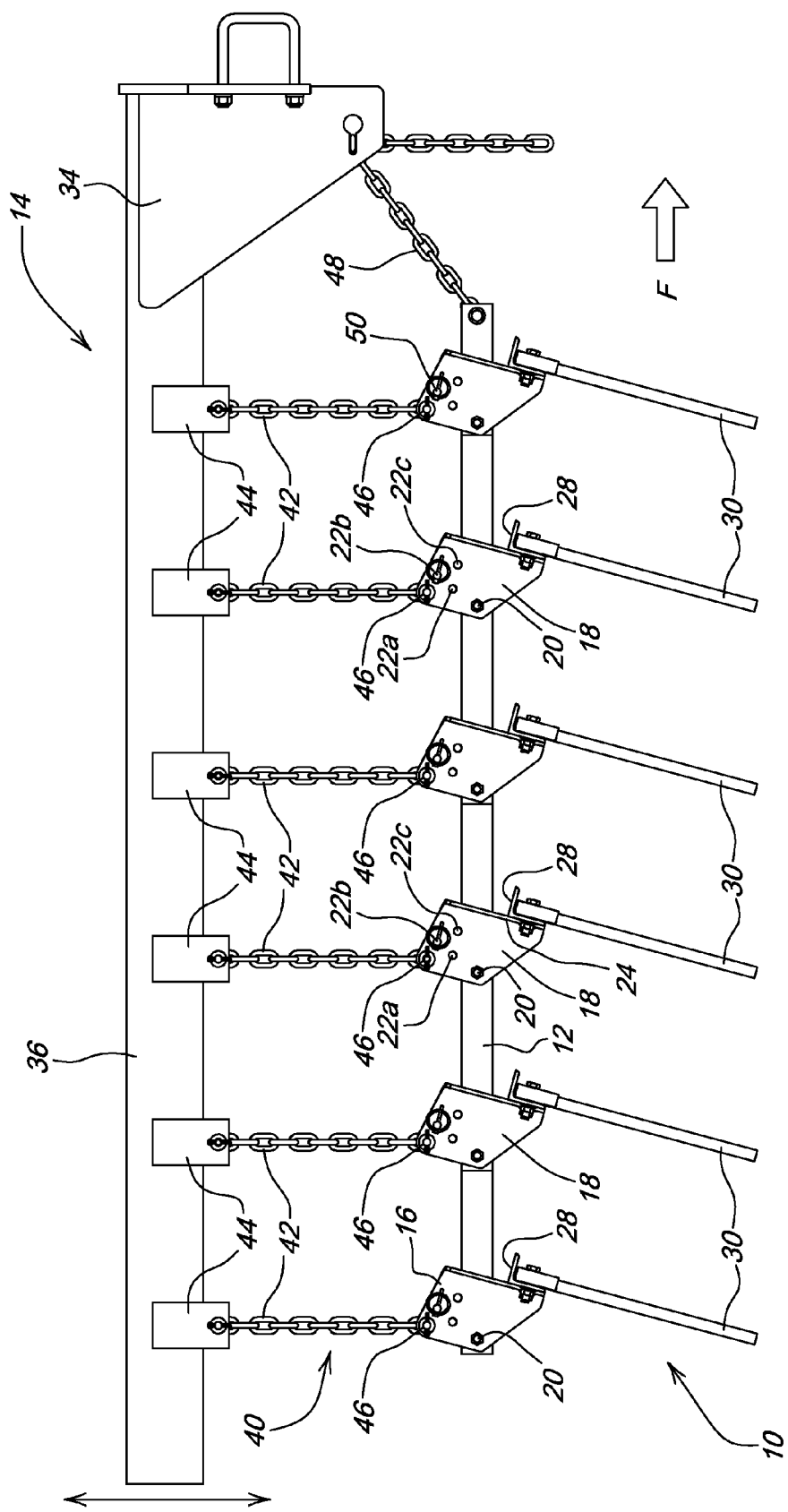
FIG. 1 is a side view of a portion of a spike tooth harrow in the raised transport position.

Referring to the drawing figures, a spike tooth harrow 10 is shown and includes transversely spaced fore-and-aft extending connecting straps 12 adapted for towing in the forward direction (F) by drawbar structure 14. A plurality of pivoting brackets 16 include planar upright apertured sides 18 connected on opposite sides of the strap 12 by a pivot pin 20. Apertures 22a, 22b, 22c are located radially outwardly of axis 20a of the pivot pin 20. Flanges 24 extend transversely outwardly from the sides 18. A plurality of tooth support angles 28 are fixed to the flanges 24 and extend transversely between brackets 16 on adjacent connecting straps 12. Earthworking teeth or spikes 30 are connected to the angle 28 at transversely spaced locations.

The drawbar structure 14 includes a drawbar bracket 34 connected to the frame of the towing implement (not shown). Rearwardly extending drawbars 36 are cantilevered from the drawbar bracket 34 and include linkage structure 40 extending between the drawbars 36 and the pivoting brackets 16. The drawbar structure 14 is movable vertically with the towing implement or by other conventional means between a raised transport position (FIG. 1) wherein the teeth 30 are offset above the ground and a lowered field-working position wherein the teeth 30 engage the ground to level the soil and break up clods.

As shown, the linkage structure 40 includes chains 42 connected between drawbar brackets 44 and corners 46 of the pivoting brackets 16 offset from the pivot pins 20. A more horizontally disposed towing chain 48 is connected between the lower aft end of the bracket 34 and the forward end of the connecting strap 12.

Figure 2:
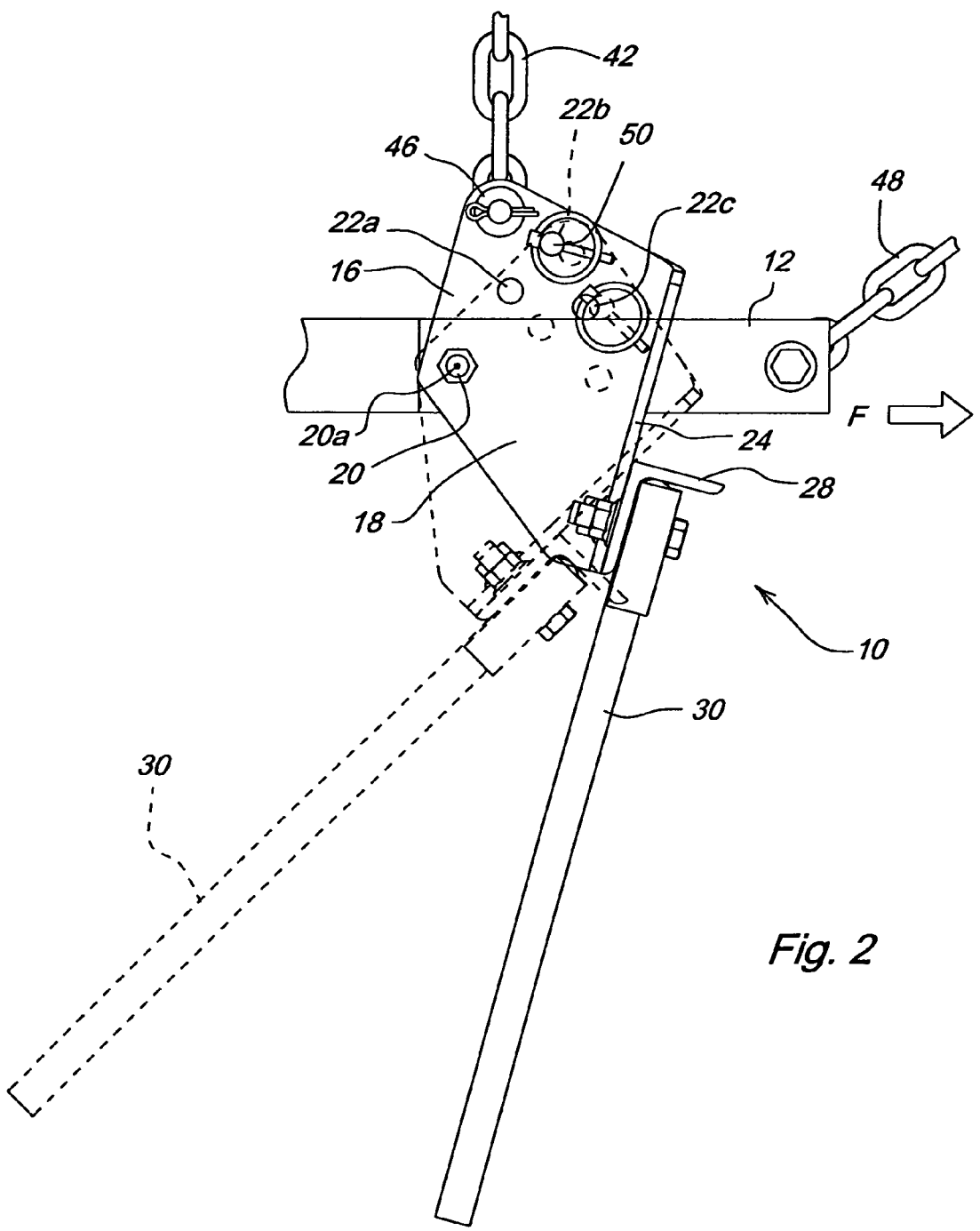
FIG. 2 is an enlarged view of pivotal connection of the one of the ranks of teeth to the connecting strap for the harrow of FIG. 1, with the broken lines showing the adjusted field-working position of the rank.

In the raised transport position as shown in FIG. 1, the chains 42 support the lower portion of the harrow 10 from the drawbar 36. The weight of the harrow 10 as the harrow is suspended from the drawbar biases the pivoting brackets 16 about the axes of the pins 20 to positions wherein the apertures 22a, 22b and 22c are offset from the top of the corresponding strap 12. To set the working angle of the teeth 30, an adjusting pin 50 (FIG. 2) is secured in a selected on of the apertures 22a, 22b and 22c, depending upon the desired angle. When the harrow 10 is lowered to the field-working position and towed in the forward direction F, the tines 30 and therefore the brackets 16 are urged in the rearward direction (clockwise as shown in the figures) about the axes 20a by the force of the soil against the tines. However, each adjusting pin 50 bottoms against the top of the connecting strap 12 (broken lines of FIG. 2) to prevent rearward pivoting of the tines 30 beyond the selected working angle.

To change the working angle of the tines 30, the harrow 10 is raised to the transport position to remove any pressure of the pin 50 against the connecting strap 12. The pin 50 is then removed from the current aperture and repositioned an a different aperture to change the angle at which the pin bottoms against the strap 12. As shown, the tine angle can be adjusted to 15, 30 or 45 degrees depending on which of the apertures is selected for receipt of the pin 50. The tines 30 can pivot in the counterclockwise direction if the towing implement is reversed while the tines are in contact with the ground.

Having described the preferred embodiment, it will become apparent that various modifications can be made without departing from the scope of the invention as defined in the accompanying claims.

The invention claimed is:

1. An adjustable angle tooth harrow comprising:
   a harrow drawbar structure towable in a forward direction over ground and movable between a raised transport position and a lowered field-working position,
   a fore-and-aft extending rigid support strap;
   an apertured bracket pivotally connected to the support strap for rotation about an axis transverse to the forward direction and having a plurality of apertures offset from the axis, wherein the axis is fixed relative to the support strap;

a tooth bar connected to the apertured bracket for rotation therewith and supported from the bracket for forward movement over the ground, the forward movement over the ground when the drawbar is in the field-working position biasing the tooth bar and the bracket in a first rotational direction about the axis;

linkage structure connected to the drawbar structure and to the apertured bracket at a fixed location on the bracket offset from the axis, the linkage suspending the tooth bar from the drawbar structure, wherein the linkage structure biases the apertured bracket a first rotational direction about the axis when the drawbar structure is in the raised transport position; and adjusting pin structure insertable into a selected one of the apertures, the pin contacting the support strap to limit rotation of the tooth bar to a tooth working position dependent on the selected aperture, and wherein the linkage structure supports the tooth bar from the harrow drawbar and thereby biases the adjusting pin structure about the axis to a non-contact position relative to the support strap when the drawbar is in the raised transport position.

2. The harrow as set forth in claim 1 wherein the linkage structure comprises a chain.

3. The harrow as set forth in claim 1 wherein the linkage structure is connected to the bracket adjacent the apertures and, when the drawbar structure is in the transport position, biases the bracket to a position wherein the apertures are offset from the support strap to facilitate the insertion of the adjusting pin into the selected aperture.

4. The harrow as set forth in claim 1 wherein the apertures include at least three apertures offset radially outwardly from the axis and provide at least three different tooth working positions.

5. An adjustable angle tooth harrow comprising:
a harrow drawbar structure towable in a forward direction over ground movable between a raised transport position and a lowered field-working position,
a rigid fore-and-aft extending support strap;
an adjusting bracket pivotally connected to the support strap for rotation about an axis transverse to the forward direction, the axis being fixed relative to the support strap;
a tooth bar supporting earthworking teeth connected to the adjusting bracket for rotation therewith about the axis and supported from the bracket for forward movement over the ground, the forward movement over the ground when the drawbar is in the field-working rotating the tooth bar and the bracket in a first rotational direction about the axis;
linkage structure connected to the drawbar structure and to the adjusting bracket, the linkage structure suspending the tooth bar from the drawbar structure, the linkage structure connected to the adjusting bracket at a fixed location on the adjusting bracket offset from the axis for biasing the adjusting bracket in a rotational direction opposite the first rotational direction when the harrow drawbar is in the raised transport position; and
the adjusting bracket including a selectively positionable rotation limiting stop limiting rotation of the tooth bar in the first rotational direction to selected tooth working position.

6. The harrow as set forth in claim 5 wherein the adjusting bracket comprises an apertured bracket having a plurality of apertures, and wherein the rotation limiting stop comprises pin structure inserted into a selected one of the apertures.

7. The harrow as set forth in claim 6 wherein the pin structure contacts the support strap when the selected tooth working position is approached.

8. The harrow as set forth in claim 7 wherein the pin structure is offset from the support strap when the harrow drawbar is in the transport position thereby facilitating positioning of the pin structure in the selected one of the apertures.

9. The harrow as set forth in claim 5 wherein the linkage structure comprises a chain connected to the adjusting bracket at a location offset from the axis.

* * * * *